March 21, 1950

R. G. LE TOURNEAU 2,501,062

CABLE LAYER

Filed Dec. 16, 1944

INVENTOR
R. G. LeTourneau

ATTORNEYS

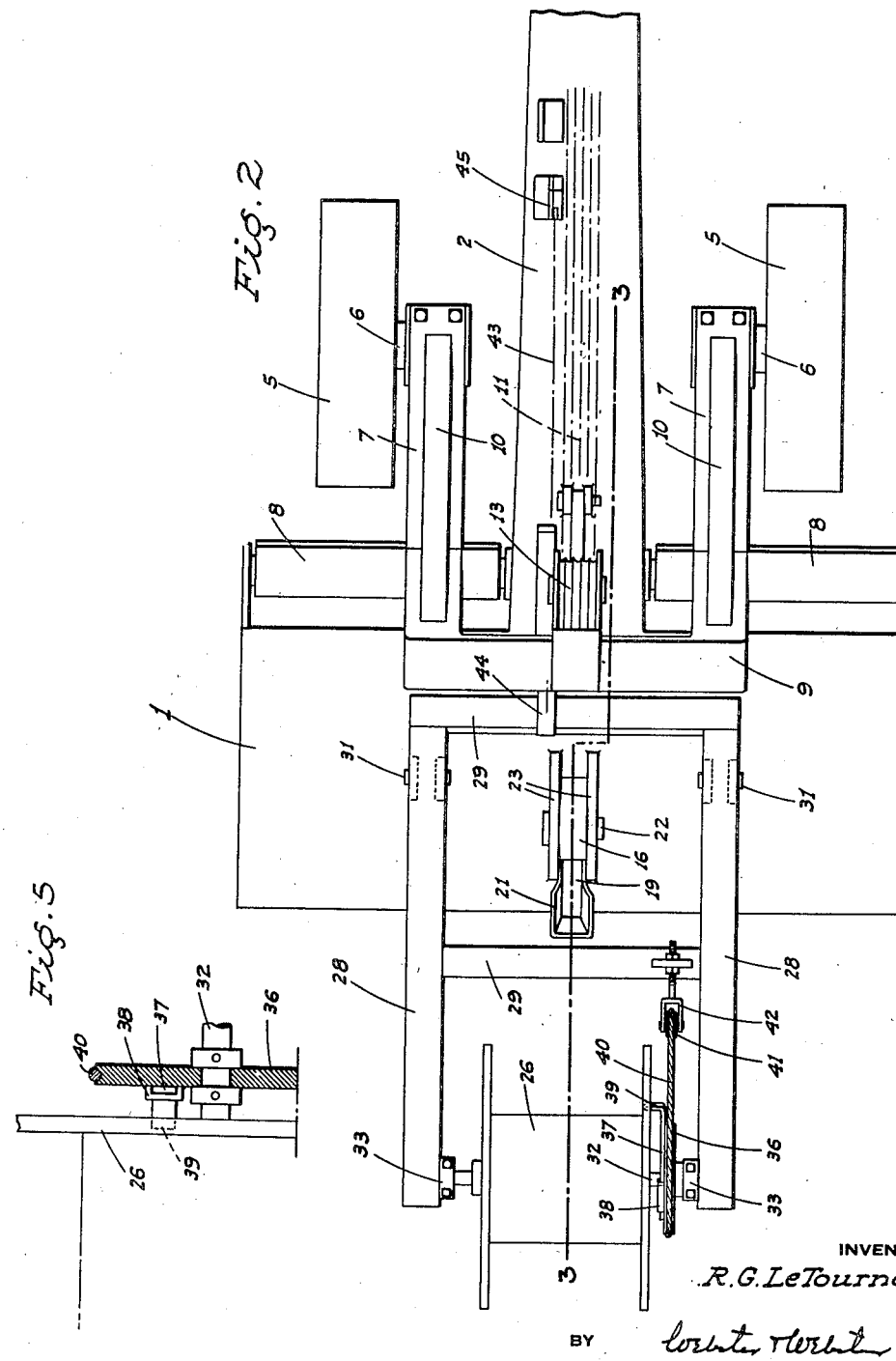

March 21, 1950         R. G. LE TOURNEAU         2,501,062
                           CABLE LAYER
Filed Dec. 16, 1944                           3 Sheets-Sheet 3
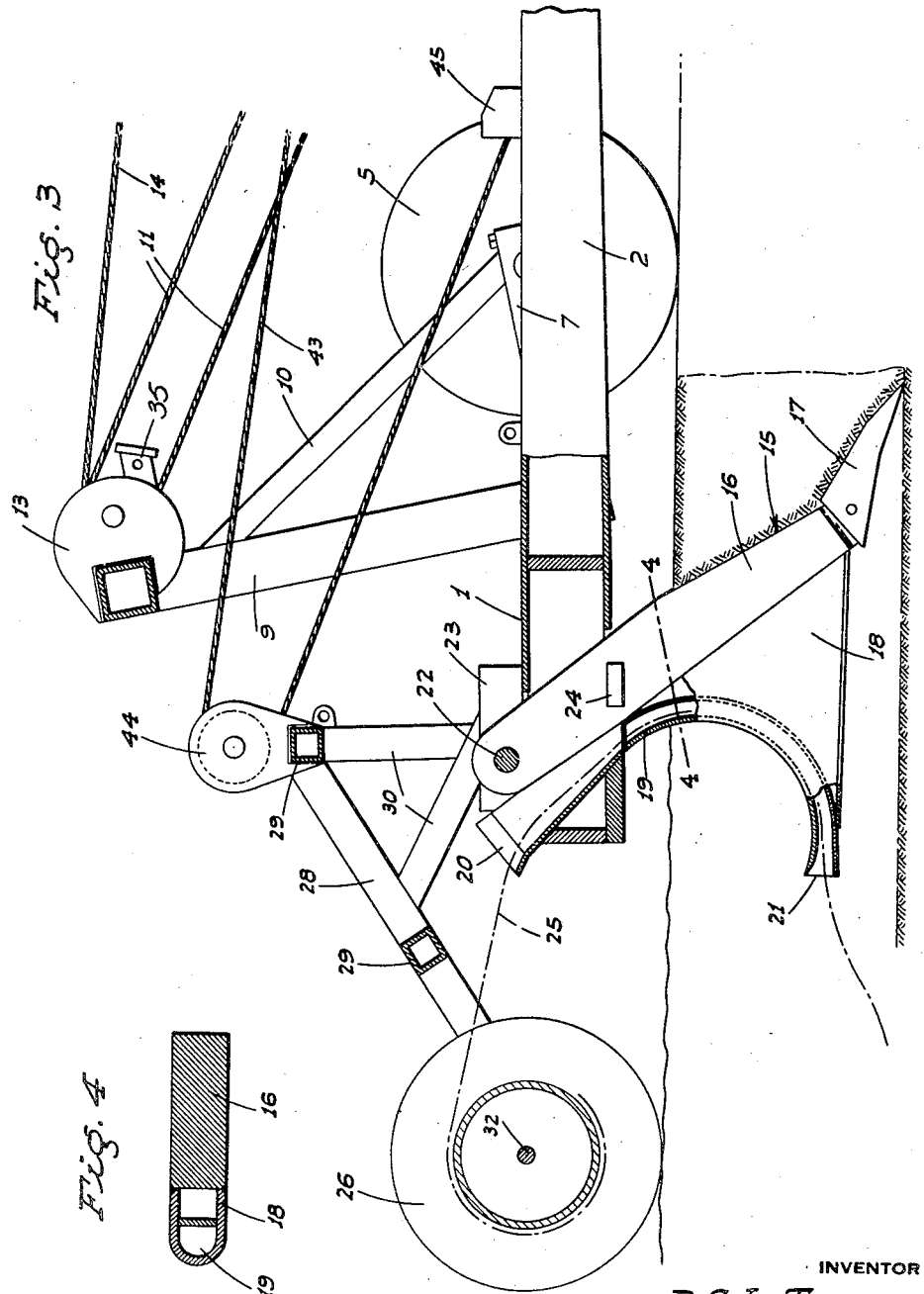
INVENTOR
R.G.LeTourneau
BY
ATTORNEYS Patented Mar. 21, 1950

2,501,062

UNITED STATES PATENT OFFICE 2,501,062

CABLE LAYER

Robert G. Le Tourneau, Peoria, Ill., assignor to R. G. Le Tourneau, Inc., Stockton, Calif., a corporation of California Application December 16, 1944, Serial No. 568,417

3 Claims. (Cl. 111—5)

This invention is directed to, and it is an object to provide, an improved implement for laying underground cables, such as telephone cables or the like; the implement being operative, with its advance, to open a continuous trench and to deposit the cable therein.

A further object of the invention is to provide a cable layer which comprises, in novel assembly, a body supported for tractor-drawn movement along the ground, a trench opening plow and cable laying shank unit fixed on and depending from the body for ground penetration, and a cable reel holder mounted on the body in position to feed cable to said shank from the reel.

Another object is to support the body by a wheel structure which is adjustable to vary the position of the body above ground whereby to control the depth to which the cable is laid, or to raise the plow and cable laying shank unit clear of the ground for transport of the implement from place to place.

An additional object is to mount the reel holder on the body for movement between a raised position supporting the reel for properly feeding the cable to the laying shank, and a lowered position at which the heavy reels can be changed without the necessity of lifting the same off the ground; said reel holder being power actuated between said positions.

It is also an object of this invention to provide novel means cooperating with the cable reel operative to prevent the latter from overrunning when the cable is paying out therefrom, and to maintain proper tension on the cable as laid in the trench.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 2 is a plan view of the implement.

Figure 3 is an enlarged section on line 3—3 of Fig. 2.

Figure 4 is an enlarged cross section on line 4—4 of Fig. 3.

Figure 5 is an enlarged fragmentary sectional elevation of the means employed to lock the reel to the friction drag unit.

Figure 1:
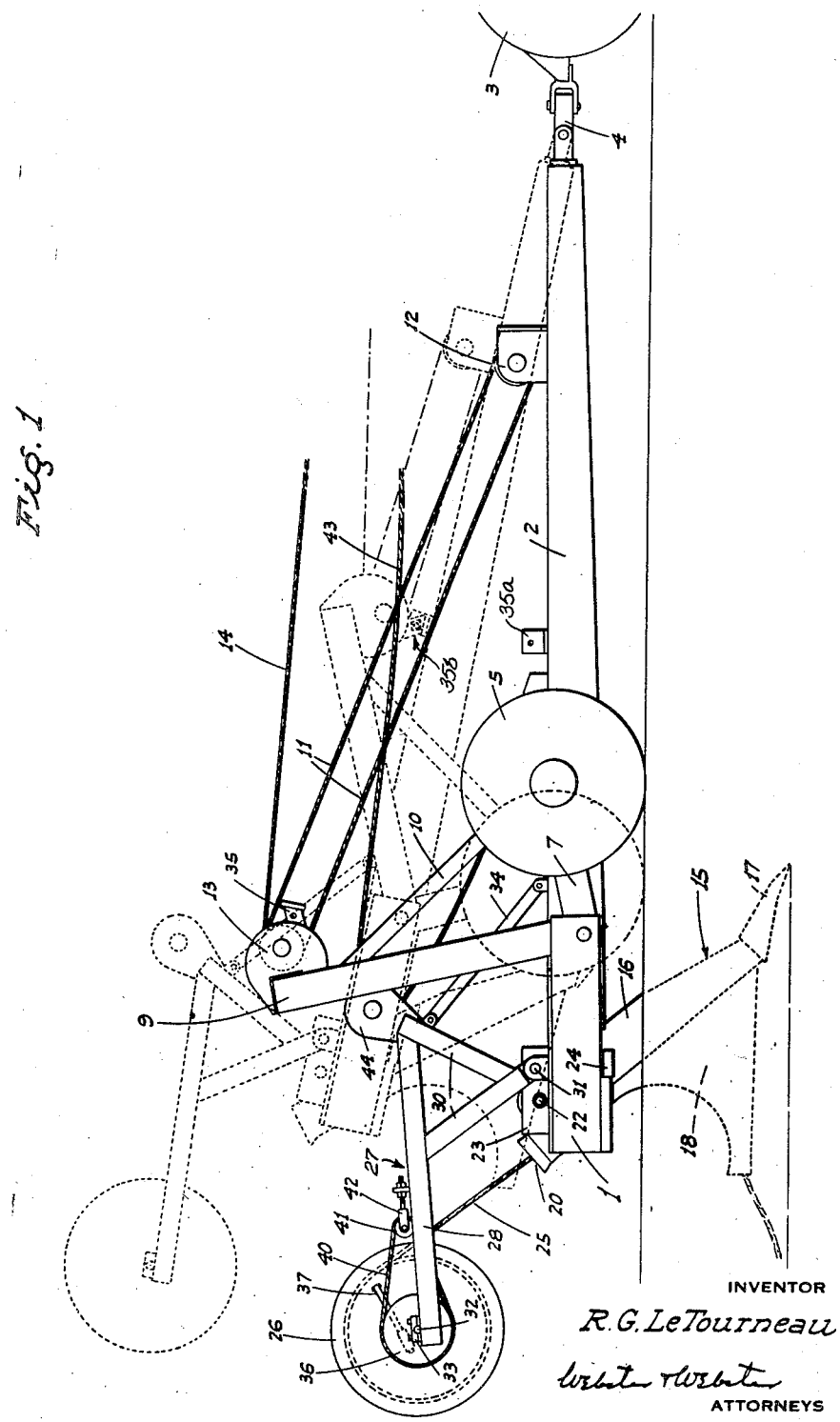
Figure 1 is a side elevation of the implement; its inoperative or transport position being shown in dotted lines.

Referring now more particularly to the characters of reference on the drawings, the cable layer comprises a heavy-duty, flat and substantially rectangular body 1 elongated transversely of the direction of travel. A rigid draft tongue 2 is fixed in connection with the body at the front and centrally between its ends; said draft tongue projecting forwardly for coupling in draft relation with a tractor, indicated diagrammatically at 3, by means of a hitch 4.

The body 1 is supported from the ground by means of a pair of transversely spaced ground engaging wheels 5 disposed ahead of the body on opposite sides of the tongue 2, said wheels being carried on spindles 6 which project laterally out from the forward ends of corresponding legs 7. The legs 7 are supported for vertical swinging movement or adjustment by means of pivotal mounts 8 secured in connection with the body at the front thereof. The legs 7 are connected together for adjustment as a unit by means of an upstanding, inverted U-shaped yoke 9 fixed at its lower ends in connection with corresponding ones of said legs 7. The assembly of legs 7 and yoke 9 is strengthened by diagonal braces 10 which extend at an upward and rearward incline from legs 7 to connection with the corresponding legs of said yoke. It will be seen that upon swinging movement of the yoke 9 in one direction or the other, the wheels 5 will be either raised or lowered, effecting a corresponding adjustment of the body 1 relative to the ground, for the purpose which will hereinafter appear. Such movement of the yoke 9 is accomplished by means of a block and tackle system 11 extending between a multiple sheave block 12 on the tongue 2 adjacent its forward end and another sheave block 13 fixed centrally on the top of the yoke 9; the block and tackle system 11 including an operating or pull reach 14 which leads forwardly to one drum of a conventional, multiple-drum power control unit or winch (not shown) mounted on the tractor at the rear and driven by the tractor engine.

A trench opening plow and cable laying shank unit, indicated generally at 15, depends from the body 1 adjacent the rear thereof and centrally between its sides; said unit 15 including a forwardly and downwardly inclined standard 16 in the form of a heavy-duty bar fitted at its lower end with a shoe or plow 17. To the rear of standard 16 the unit 15 includes a cable laying shank 18. The shank 18 has formed therein a tubular guideway 19 which extends, from its open upper end 20, at a forward and downward incline corresponding, for some distance, generally to the incline of standard 16, and thence curves rearwardly and opens, at its lower end 21, in a rearward and substantially horizontal direction; the lower end of the guideway 19 being disposed slightly above the working plane of the shoe or plow 17. The upper end 20 and the lower end 21 of the tubular guideway 19 are flared, as shown, to facilitate cable entry and cable delivery, respectively, from the cable laying shank 18.

The unit 15 may be rigidly secured in connection with the body 1 by any suitable means, which is here shown as an opening in the body through which the corresponding part of the standard 16 and shank 18 project upwardly; there being a cross pin 22 extending through the shank 16 between upstanding ears 23 on the body, while a cross bar 24 extends through the standard 16 and abuts rearwardly against an adjacent portion of the bottom part of body 1. When the unit 15 is mounted as described the upper end 20 is exposed at the top and rear of the body 1 for reception of the cable 25 from the reel 26; the latter being normally supported above and rearwardly of the body 1 by a reel holder, indicated generally at 27. Such reel holder comprises a pair of transversely spaced parallel arms 28 which are disposed above the rear end portion of the body 1 and project rearwardly therefrom; said arms 28 being fixed together by cross members 29 and supported for vertical swinging movement as a unit by means of a pair of downwardly converging legs 30 fixed on each arm 28 at the rear. The legs 30 are pivotally connected at their lower ends, as at 31, on the body 1 at the top and adjacent its rear end. The reel 26 is rotatably supported in the reel holder on a cross shaft 32 removably carried in journals 33.

The above described reel holder is normally maintained in operative position with the arms 28 substantially horizontal and the reel 26 in the position shown in full lines in Fig. 1, by means of a tension link 34 connected between the reel holder at the top and front and thence extending at a forward and downward incline to connection with the tongue 2 adjacent its rear end. In this position of the reel holder the cable pays freely from the reel 26 into the tubular guideway 19.

When the device is in operation the body 1 is lowered, by adjustment of the wheels 5, to provide the desired penetration of the trench opening plow and cable laying shank unit 15 into the ground. Such adjustment of the wheels is of course accomplished through the medium of the block and tackle system 11 and the upstanding swingable yoke 9. The unit 15, with advance of the implement, cuts a relatively narrow trench into which the cable 25, previously anchored at its free end in the start of the trench, is fed from the lower end 21 of the tubular guideway 19 in the shank 18. This operation is clearly illustrated in Figs. 1 and 3.

For transport of the implement the wheels are adjusted relative to the body so that the latter is elevated to the position shown in dotted lines in Fig. 1, at which time the plow and cable-laying shank unit 15 are clear of the ground; the yoke then being in its foremost position and is held in said position independently of the block and tackle system 11 by means of attachment brackets 35 and 35a, on the sheave block 13 and tongue 2, respectively, detachably bolted together, as shown by the dotted lines at 35b in Fig. 1.

In order to prevent the reel 26 from overrunning when the implement is in operation, and for the purpose of maintaining the proper tension on the cable as it is laid, the following friction drag arrangement is provided:

A relatively large diameter pulley 36 is turnably mounted on cross shaft 32 beyond one end of the reel 26; said pulley being detachably connected to the reel to prevent relative rotation therebetween by means of a strap 37 which removably anchors at one end in a socket 38 on the side of the pulley 36 adjacent the reel, and removably engaged at its other end, by means of a right-angle finger 39, in a socket in the adjacent end of the reel.

An endless, friction cord 40 of rope or the like extends between the pulley 36 and another relatively smaller pulley 41 disposed ahead of but in alinement with said pulley 36; the pulley 41 being carried in a yoke 42 mounted for adjustment radially of the pulley 36 whereby to vary the tension on friction cord 40.

With the above arrangement, and with proper tension on the friction cord 40, a friction drag is applied to the reel 26, which prevents it from overrunning when the implement is laying cable, and also maintains the desired tension on the cable as laid.

When the reel 26 is empty and it is desired to replace it with a full reel, the link 34 is detached and the reel holder 27 is permitted to rock backward until the reel 26 rests upon the ground. With the reel holder 27 in this position the cross shaft 32 is readily removable and a new reel may be rolled into place and mounted on the reel holder with ease. Movement of the reel holder from its normal operative position to its lowered position, for replacement of the reel, is accomplished through the medium of a cable 43 which leads rearwardly from another drum of the tractor mounted power control unit or winch and extends over a sheave block 44 fixed centrally on the forward and upper end of said reel holder; the cable thence extending forwardly and downwardly to connection with an anchor 45 on the tongue. With paying out of the cable 43 the reel holder will lower to the reel changing position, as shown in Fig. 3, while subsequent shortening of the cable will swing the reel holder upwardly to its operative position, with the reel in elevated position above and to the rear of the body for proper feeding of the cable 25 into the cable-laying shank 18.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A cable laying implement comprising a wheel supported body, a trench opening plow mounted on and depending from the body, a reel holder mounted on the body, and means to guide cable from the reel into the trench upon advance of the implement; said reel holder comprising a unitary frame having a pair of spaced, parallel arms projecting at one end in overhanging relation to the ground, means to removably and rotatably support a cable reel between said arms adjacent said one end thereof, means pivoting the frame on the body for vertical swinging movement of said arms from a position with the reel on the ground to a position with the reel elevated to feed to said guide means, and means to swing the frame between said positions.

2. A cable layer as in claim 1 in which said frame includes depending legs at the ends of the arms opposite the reel, said legs being pivoted to the body and upstanding therefrom, and a pull cable connected to the frame above said pivots.

3. A cable laying implement comprising a body having a trench opening plow depending therefrom, cable guide means depending from the body to the rear of the plow to guide cable from above the body into the trench, a pair of transversely spaced, vertically swingable legs pivotally mounted on and projecting forwardly from the body, wheels on said legs, adjustable means normally maintaining said legs in fixed position relative to the body, a pair of transversely spaced vertically swingable arms pivotally mounted on and projecting rearwardly from the body, means to support a reel between the outer end of said arms, said arms being swingable from a position with the reel on the ground to a position with the reel elevated to a point to feed cable to said cable guide means, and means to swing the arms as a unit between said positions.

ROBERT G. LE TOURNEAU.

REFERENCES CITED

The following references are of record in the file of this patent:

UNITED STATES PATENTS

| Number | Name | Date |
|---|---|---|
| 713,692 | Schopf | Nov. 18, 1902 |
| 1,054,313 | Richardson | Feb. 25, 1913 |
| 1,299,550 | Buck | Apr. 8, 1919 |
| 1,513,937 | Seidler | Nov. 4, 1924 |
| 1,914,521 | Miller et al. | June 20, 1933 |
| 2,070,934 | Thompson | Feb. 16, 1937 |
| 2,155,044 | Gray et al. | Apr. 18, 1939 |
| 2,184,912 | Freeman et al. | Dec. 26, 1939 |
| 2,345,929 | Freeman | Apr. 4, 1944 |

FOREIGN PATENTS

| Number | Country | Date |
|---|---|---|
| 14,379 | Great Britain | June 15, 1914 |
| 559,901 | Great Britain | Mar. 9, 1944 |